(12) United States Patent
Curry et al.

(10) Patent No.: US 6,984,696 B2
(45) Date of Patent: Jan. 10, 2006

(54) ELASTIC BLENDS OF SEMICRYSTALLINE PROPYLENE POLYMERS AND HIGH GLASS TRANSITION TEMPERATURE MATERIALS

(75) Inventors: Christopher L. Curry, Seabrook, TX (US); Sudhin Datta, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 103 days.

(21) Appl. No.: 10/402,275

(22) Filed: Mar. 28, 2003

(65) Prior Publication Data

US 2004/0192823 A1 Sep. 30, 2004

(51) Int. Cl.
*C08K 11/00* (2006.01)
*C08L 23/00* (2006.01)
*C08L 23/04* (2006.01)
*C08L 45/00* (2006.01)
*C08L 99/00* (2006.01)

(52) U.S. Cl. ............... 525/191; 525/216; 525/240; 524/77; 524/78; 524/270; 524/274

(58) Field of Classification Search .......... 525/191, 525/216, 240; 524/77, 78, 270, 274
See application file for complete search history.

(56) References Cited

U.S. PATENT DOCUMENTS

| | | | |
|---|---|---|---|
| 4,921,749 A | 5/1990 | Bossaert et al. ............ 428/349 |
| 5,079,273 A | 1/1992 | Kuroda et al. ............. 521/139 |
| 5,171,628 A * | 12/1992 | Arvedson et al. .......... 442/415 |
| 5,213,744 A * | 5/1993 | Bossaert ................ 264/173.19 |
| 5,290,635 A | 3/1994 | Matsumura et al. ........ 428/516 |
| 5,652,308 A | 7/1997 | Merrill et al. ............. 525/211 |
| 6,080,818 A | 6/2000 | Thakker et al. ............ 525/240 |
| 6,096,420 A | 8/2000 | Wilhoit et al. ............. 428/343 |
| 6,165,599 A | 12/2000 | Demeuse .................... 428/213 |
| 6,187,449 B1 * | 2/2001 | Sasaki et al. ............... 428/517 |
| 6,388,013 B1 | 5/2002 | Saraf et al. ................. 525/191 |
| 6,500,563 B1 | 12/2002 | Datta et al. ................ 428/521 |
| 6,503,588 B1 * | 1/2003 | Hayashi et al. ............ 428/36.7 |
| 2002/0019507 A1 | 2/2002 | Karandinos et al. ..... 526/348.2 |
| 2002/0064611 A1 | 5/2002 | Kanai et al. ............... 428/34.1 |
| 2002/0155283 A1 | 10/2002 | Carter et al. ............... 428/343 |

FOREIGN PATENT DOCUMENTS

| WO | WO 00/00564 | 1/2000 |
|---|---|---|
| WO | WO 00/01766 | 1/2000 |

* cited by examiner

*Primary Examiner*—Nathan M. Nutter
(74) *Attorney, Agent, or Firm*—Leandro Arechederra

(57) ABSTRACT

Compositions are provided having from 70 wt % to 95 wt % of a polymer selected from homopolymers and random copolymers of propylene and from 5 wt % to 30 wt % of a miscible hydrocarbon resin with a glass transition temperature greater than 20° C. The polymer has a heat of fusion of less than 50 J/g, a melt index (MI) of less than 20 dg/min, and contains stereoregular propylene crystallinity. Also provided are films containing such compositions, and articles, such as diapers or incontinence garments, including such films.

54 Claims, 5 Drawing Sheets

ELASTIC BLENDS OF SEMICRYSTALLINE PROPYLENE POLYMERS AND HIGH GLASS TRANSITION TEMPERATURE MATERIALS

FIELD OF THE INVENTION

The present invention relates to elastic blends of semicrystalline, propylene-containing polymers and low molecular weight, high glass transition temperature materials which are miscible with the semicrystalline propylene-containing polymers.

BACKGROUND

U.S. Patent Application Publication No. 2002/0019507 discloses adhesive blends that can include a semi-crystalline copolymer of propylene and at least one comonomer selected from ethylene and at least one $C_4$ to $C_{20}$ alpha-olefin, wherein the copolymer has a weight average molecular weight ($M_w$) from about 15,000 to about 200,000, a melt index (MI) from about 7 dg/min to about 3000 dg/min, and a $M_w/M_n$ of approximately 2. Also described are adhesive compositions having polymers or polymer blends with melt flow rates (MFRs) equal to and above 250 dg/min at 230° C.

Embodiments of the present invention may have one or more advantages over previously known materials, such as having an improved balance of elasticity, hysteresis properties, tensile modulus, and constant tensile modulus over a range of extensions.

SUMMARY OF THE INVENTION

In one embodiment, the present invention provides a composition including a polymer and a miscible hydrocarbon resin, the miscible hydrocarbon resin having a glass transition temperature greater than 20° C. The polymer is selected from the group consisting of homopolymers and random copolymers of propylene and has a heat of fusion as determined by Differential Scanning Calorimetry (DSC) of less than 50 J/g, a melt index (MI) of less than 5 dg/min., and contains stereoregular propylene crystallinity.

In another embodiment, the present invention provides a composition including from 70% to 95% by weight, based on the total weight of the composition, of a polymer and from 5% to 30% by weight, based on the total weight of the composition, of a miscible hydrocarbon resin having a glass transition temperature greater than 20° C. The polymer is selected from the group consisting of homopolymers and random copolymers of propylene and has a heat of fusion as determined by DSC of less than 50 J/g, a melt index (MI) of less than 20 dg/min, and contains stereoregular propylene crystallinity.

In a particular aspect of any of the embodiments described herein, the composition has one or more of the following characteristics, in any combination:

the composition has a tension set of less than 20%, or less than 12%, or less than 10%;

the composition has a tension set TS and a 500% modulus $M_{500\%}$ conforming to the relationship: $TS \leq 0.01 * M_{500\%} + 12.5$, where M is in units of psi;

the composition has a single glass transition temperature at least 1° C. lower than the glass transition temperature of the hydrocarbon resin;

the composition has a tensile modulus at least 10% lower than the tensile modulus of the polymer;

the polymer is present in the composition in an amount within the range having a lower limit of 70%, 75%, or 80% by weight to an upper limit of 90%, 95%, or 99% by weight, based on the total weight of the composition;

the polymer has isotactic stereoregular propylene crystallinity;

the polymer is a random copolymer of propylene and at least one comonomer selected from ethylene, $C_4$–$C_{12}$ α-olefins, and combinations thereof;

the polymer comprises from 2 wt % to 25 wt % polymerized ethylene units, based on the total weight of the polymer;

the polymer has a narrow compositional distribution;

the polymer has a melting point as determined by DSC of from 25° C. to 110° C., or from 35° C. to 70° C.;

the polymer has a heat of fusion as determined by DSC within the range having an upper limit of 50 J/g or 10 J/g and a lower limit of 1 J/g or 3 J/g;

the polymer has a molecular weight distribution Mw/Mn of from 2.0 to 4.5;

the polymer has a melt index (MI) of less than 7 dg/min, or less than 2 dg/min;

the hydrocarbon resin is present in the composition in an amount within the range having a lower limit of 1%, 5%, or 10% by weight to an upper limit of 15%, 18%, 20%, 25%, or 30% by weight, based on the total weight of the composition;

the hydrocarbon resin is a hydrogenated cycloaliphatic resin;

the hydrocarbon resin has a molecular weight (Mn) of from 200 to 5000, or from 200 to 1000, or from 500 to 1000; and the hydrocarbon resin has a softening point within the range having an upper limit of 180° C., or 150° C., or 140° C. and a lower limit of 80° C., or 120° C., or 125° C.

In another embodiment, the present invention provides an elastic film including at least one layer comprising any of the inventive compositions described herein. In a particular aspect of this embodiment, the film is a monolayer film. In another particular aspect of this embodiment, the film is a multilayer film.

In another embodiment, the invention provides a garment structure, such as diapers and incontinence garments, which include any of the inventive compositions described herein.

DETAILED DESCRIPTION

Polymer

Figure 1:
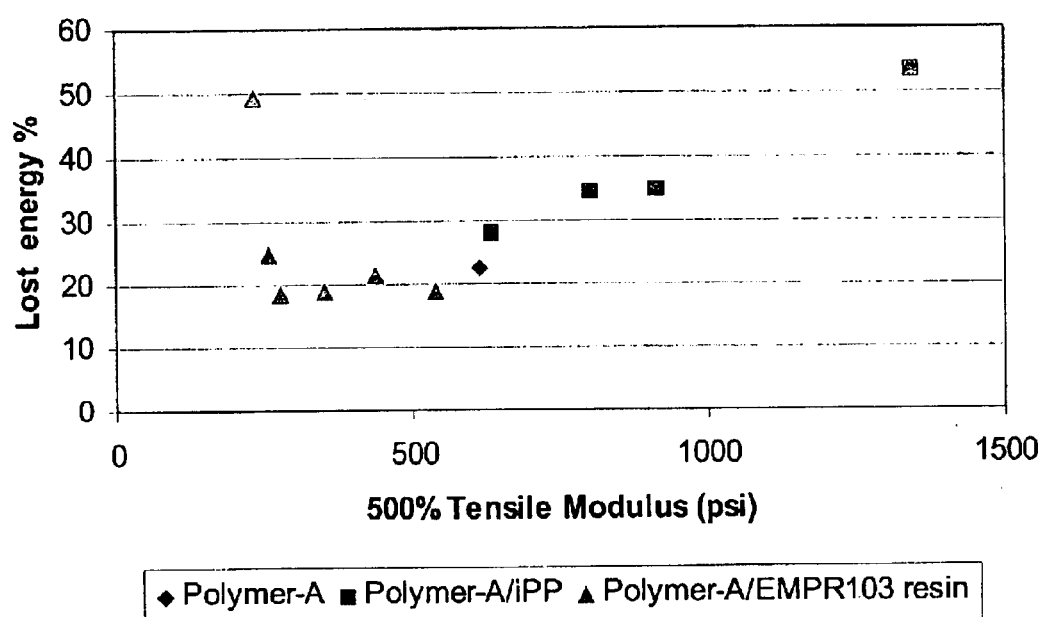
FIG. 1 is a graph of the lost energy versus 500% tensile modulus of several comparative and inventive films.

The polymer of the present invention is an elastic polymer with a moderate level of crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the polymer further includes a non-conjugated diene monomer to aid in vulcanization and other chemical modification of the blend composition. The amount of diene present in the polymer is preferably less than 10% by weight, and more preferably less than 5% by weight. The diene may be any non-conjugated diene which is commonly used for the vulcanization of ethylene propylene rubbers including, but not limited to, ethylidene norbornene, vinyl norbornene, and dicyclopentadiene.

In one embodiment, the polymer is a random copolymer of propylene and at least one comonomer selected from ethylene, $C_4$–$C_{12}$ α-olefins, and combinations thereof. In a particular aspect of this embodiment, the copolymer includes ethylene-derived units in an amount ranging from a lower limit of 2%, 5%, 6%, 8%, or 10% by weight to an upper limit of 20%, 25%, or 28% by weight. This embodiment will also include propylene-derived units present in the copolymer in an amount ranging from a lower limit of 72%, 75%, or 80% by weight to an upper limit of 98%, 95%, 94%, 92%, or 90% by weight. These percentages by weight are based on the total weight of the propylene and ethylene-derived units; i.e., based on the sum of weight percent propylene-derived units and weight percent ethylene-derived units being 100%. The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=$82.585-111.987X+30.045X^2$, wherein X is the ratio of the peak height at 1155 $cm^{-1}$ and peak height at either 722 $cm^{-1}$ or 732 $cm^-$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128–1130. Different but similar methods are equally functional for this purpose and well known to those skilled in the art.

Comonomer content and sequence distribution of the polymers can be measured by $^{13}C$ nuclear magnetic resonance ($^{13}C$ NMR), and such method is well known to those skilled in the art.

In one embodiment, the polymer is a random propylene copolymer having a narrow compositional distribution. In another embodiment, the polymer is a random propylene copolymer having a narrow compositional distribution and a melting point as determined by DSC of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution (i.e., randomness) of the copolymer may be determined by $^{13}C$ NMR, which locates the comonomer residues in relation to the neighbouring propylene residues. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow compositional distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of the polymers may be expressed in terms of heat of fusion. Embodiments of the present invention include polymers having a heat of fusion, as determined by DSC, ranging from a lower limit of 1.0 J/g, or 3.0 J/g, to an upper limit of 50 J/g, or 10 J/g. Without wishing to be bound by theory, it is believed that the polymers of embodiments of the present invention have generally isotactic crystallizable propylene sequences, and the above heats of fusion are believed to be due to the melting of these crystalline segments.

The crystallinity of the polymer may also be expressed in terms of crystallinity percent. The thermal energy for the highest order of polypropylene is estimated at 189 J/g. That is, 100% crystallinity is equal to 189 J/g. Therefore, according to the aforementioned heats of fusion, the polymer has a polypropylene crystallinity within the range having an upper limit of 65%, 40%, 30%, 25%, or 20%, and a lower limit of 1%, 3%, 5%, 7%, or 8%.

The level of crystallinity is also reflected in the melting point. The term "melting point," as used herein, is the highest peak among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The polymer preferably has a melting point by DSC ranging from an upper limit of 110° C., 105° C., 90° C., 80° C., or 70° C., to a lower limit of 0° C., 20° C., 25° C., 30° C., 35° C., 40° C., or 45° C.

The polymers used in the invention have a weight average molecular weight (Mw) within the range having an upper limit of 5,000,000 g/mol, 1,000,000 g/mol, or 500,000 g/mol, and a lower limit of 10,000 g/mol, 20,000 g/mol, or 80,000 g/mol, and a molecular weight distribution Mw/Mn (MWD), sometimes referred to as a "polydispersity index" (PDI), ranging from a lower limit of 1.5, 1.8, or 2.0 to an upper limit of 40, 20, 10, 5, or 4.5. The Mw and MWD, as used herein, can be determined by a variety of methods, including those in U.S. Pat No. 4,540,753 to Cozewith, et al., and references cited therein, or those methods found in Verstrate et al., Macromolecules, v. 21, p. 3360 (1988), the descriptions of which are incorporated by reference herein for purposes of U.S. practices.

In one embodiment, the polymer has a Mooney viscosity, ML(1+4) @ 125° C., of 100 or less, 75 or less, 60 or less, or 30 or less. Mooney viscosity, as used herein, can be measured as ML(1+4) @ 125° C. according to ASTM D1646, unless otherwise specified.

The polymers used in embodiments of the present invention can have a tacticity index (m/r) ranging from a lower limit of 4 or 6 to an upper limit of 8, 10, or 12. The tacticity index, expressed herein as "m/r", is determined by $^{13}C$ nuclear magnetic resonance (NMR). The tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one embodiment, the polymer has isotactic stereoregular propylene crystallinity. The term "stereoregular" as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}C$ NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

PPP(mm):

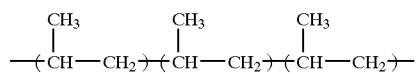

PPP(mr):

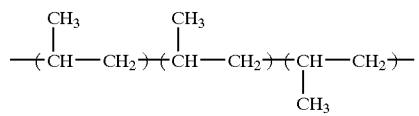

PPP(rr):

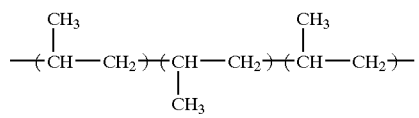

The $^{13}C$ NMR spectrum of the propylene copolymer is measured as described in U.S. Pat. No. 5,504,172. The spectrum relating to the methyl carbon region (19–23 parts per million (ppm)) can be divided into a first region (21.2–21.9 ppm), a second region (20.3–21.0 ppm) and a third region (19.5–20.3 ppm). Each peak in the spectrum was assigned with reference to an article in the journal *Polymer*, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The polymers of embodiments of the present invention have a triad tacticity of three propylene units, as measured by $^{13}C$ NMR, of 75% or greater, 80% or greater, 82% or greater, 85% or greater, or 90% or greater.

In embodiments of the present invention, the polymer has a melt index (MI) of 20 dg/min or less, 7 dg/min or less, 5 dg/min or less, or 2 dg/min or less, or less than 2 dg/min. The determination of the MI of the polymer is according to ASTM D1238 (190° C., 2.16 kg). In this version of the method a portion of the sample extruded during the test was collected and weighed. This is commonly referred to as the modification 1 of the experimental procedure. The sample analysis is conducted at 190° C. with a 1 minute preheat on the sample to provide a steady temperature for the duration of the experiment.

Polymers of the present invention are present in the inventive blend compositions in an amount ranging from a lower limit of 70%, 75%, or 80%, or 82%, or 85% by weight based on the total weight of the composition, to an upper limit of 99%, 95%, or 90% by weight based on the total weight of the composition.

The polymer may be produced by any process that provides the desired polymer properties, in heterogeneous polymerization on a support, such as slurry or gas phase polymerization, or in homogeneous conditions in bulk polymerization in a medium comprising largely monomer or in solution with a solvent as diluent for the monomers. For industrial uses, continuous polymerization processes are preferred. Homogeneous polymers are often preferred in the invention. For these polymers, preferably the polymerization process is a single stage, steady state, polymerization conducted in a well-mixed continuous feed polymerization reactor. The polymerization can be conducted in solution, although other polymerization procedures such as gas phase or slurry polymerization, which fulfil the requirements of single stage polymerization and continuous feed reactors, are contemplated.

The polymer may be made advantageously by the continuous solution polymerization process described in WO 02/34795, advantageously in a single reactor and separated by liquid phase separation from the alkane solvent.

Polymers of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, *J. Organomet. Chem.* (1997) 548, 23–28.

Other possible single site catalysts are metallocenes which are bis cyclopentadienyl derivatives having a group transition metal, preferably hafnium or zirconium. Such metallocenes may be unbridged as in U.S. Pat. No. 4,522,982 or U.S. Pat. No. 5,747,621. The metallocene may be adapted for producing a polymer comprising predominantly propylene derived units as in U.S. Pat. No. 5,969,070 which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. Patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis (dimethylsilyl) zirconium dichloride and MAO; WO 98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non-or weakly coordinating anion activators (NCA) derived and generated in any of the ways amply described in published patent art such as EP277004, EP426637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

In one embodiment, the polymer used in the present invention is described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference herein for purposes of U.S. patent practice.

While the polymer by itself may have good elastic properties, addition of a miscible hydrocarbon resin can help to permit an easy extension over varying distances with a moderate and substantially constant force of return from extension.

Hydrocarbon Resin

The resins of the present invention are selected to be miscible with the polymer. The resins are miscible if they meet the following criteria. In a differential scanning calorimetry (DSC) experiment, a polymer composition including the polymer and other components such as process oil show a single glass transition temperature (Tg1) between 20° C. and −50° C.; a corresponding polymer blend containing the polymer composition with the hydrocarbon resin added also show a single glass transition temperature (Tg2); and Tg2 is higher than Tg1 by at least 1° C. The resins of the present invention preferably have a glass transition temperature, by DSC, of greater than 20° C.

Resins used in embodiments of the present invention have a softening point within the range having an upper limit of 180° C., 150° C., or 140° C., and a lower limit of 80° C., 120° C., or 125° C. Softening point (° C.) is measured as a ring and ball softening point according to ASTM E-28 (Revision 1996).

The resin is present in the inventive blend compositions in an amount ranging from a lower limit of 1%, 5%, or 10% by weight based on the total weight of the composition, to an upper limit of 30%, or 25%, or 20%, or 18%, or 15% by weight based on the total weight of the composition.

Various types of natural and synthetic resins, alone or in admixture with each other, can be used in preparing the compositions described herein, provided they meet the miscibility criteria described herein. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. Examples of grafted resins and their manufacture are described in PCT Applications PCT/EP02/10794, PCT/EP02/10795, PCT/EP02/10796, and PCT/EP02/10686, which are incorporated herein by reference for U.S. purposes. For additional description of resins, reference can be made to technical literature, e.g., *Hydrocarbon Resins*, Kirk-Othmer, *Encyclopedia of Chemical Technology,* 4th Ed. v. 13, pp. 717–743 (J. Wiley & Sons, 1995).

Hydrogenated petroleum resins are usually prepared by catalytically hydrogenating a thermally polymerized steam cracked petroleum distillate fraction, especially a fraction having a boiling point of between 20° C. and 280° C. These fractions usually are of compounds having one or more unsaturated cyclic rings in the molecule, such as cyclodienes, cycloalkenes, and indenes. It is also possible to hydrogenate resins produced by the catalytic polymerization of unsaturated hydrocarbons. Before hydrogenation occurs the polymerized resin is usually dissolved in a saturated hydrocarbon solvent such as heptane. The hydrogenation catalysts that may be used include nickel, reduced nickel, or molybdenum sulphide. Hydrogenation can take place in a single stage at a temperature of 200° C. to 330° C., at a pressure of 20.26 to 121.56 bar (20 to 120 atmospheres) for a period of 5 to 7 hours. After filtering off the catalyst, the solvent is removed by distillation and recovered for recycling. An improved hydrogenation process leading to increased yields of high quality hydrogenated hydrocarbon resins is described in EP 0 082 726.

Resins suited for use as described herein include EMPR 100, 101, 102, 103, 104, 105, 106, 107, 108, 109, 110, 116, 117, and 118 resins, OPPERA™ resins, and EMFR resins available from ExxonMobil Chemical Company, ARKON™ P140, P125, P115, M115, and M135 and SUPER ESTER™ rosin esters available from Arakawa Chemical Company of Japan, SYLVARES™ polyterpene resins, styrenated terpene resins and terpene phenolic resins available from Arizona Chemical Company, SYLVATAC™ and SYLVALITE™ rosin esters available from Arizona Chemical Company, NORSOLENE™ aliphatic aromatic resins available from Cray Valley of France, DERTOPHENE™ terpene phenolic resins and DERCOLYTE™ polyterpene resins available from DRT Chemical Company of France, EASTOTAC™ resins, PICCOTAC™ resins, REGALITE™ and REGALREZ™ hydrogenated cycloaliphatic/aromatic resins available from Eastman Chemical Company of Kingsport, Tenn., WINGTACK™ resins available from Goodyear Chemical Company, PICCOLYTE™ and PERMALYN™ polyterpene resins, rosins and rosin esters available from Hercules (now Eastman Chemical Company), coumerone/indene resins available from Neville Chemical Company, QUINTONE™ acid modified $C_5$ resins, $C_5/C_9$ resins, and acid modified $C_5/C_9$ resins available from Nippon Zeon of Japan, CLEARON™ hydrogenated terpene resins available from Yasuhara. The preceding examples are illustrative only and by no means limiting.

In one embodiment, the hydrocarbon resin has a number average molecular weight (Mn) within the range having an upper limit of 5000, or 2000, or 1000, and a lower limit of 200, or 400, or 500, a weight average molecular weight (Mw) ranging from 500 to 5000, a Z average molecular weight (Mz) ranging from 500 to 10,000, and a polydispersity (PD) as measured by Mw/Mn of from 1.5 to 3.5, where Mn, Mw, and Mz are determined by size exclusion chromatography (SEC). In another embodiment, the hydrocarbon resin has a lower molecular weight than the polymer.

Blend Composition

The compositions of the present invention include from a lower limit of 70%, 75%, or 80% by weight to an upper limit of 90%, 95%, or 99% by weight of a polymer described above, based on the total weight of the composition, and from a lower limit of 1%, 5%, or 10% by weight to an upper limit of 15%, 18%, 20%, 25%, or 30% by weight of a miscible hydrocarbon resin as described above, based on the total weight of the composition.

Apart from the polymer component discussed above and the hydrocarbon resin, the composition may also include minor amounts of other polymers, consistent with the physical properties desired. Such additive polymers include crystalline polypropylene including those commonly available as isotactic polypropylene, random copolymer and impact copolymer. These polymers are differentiated from the polymers described above in having a highest melting point of not less than 100° C. Also included within the scope of the invention is the addition of various other polyolefin polymers such as low density and ultra low density copolymers of ethylene and $C_3$–$C_{20}$ alpha olefins such as propylene, butene, hexene and octene with a density in the range of 0.84 to 0.96 g/cm³.

In one embodiment, the composition has a single glass transition temperature at 1° C. lower than the glass transition temperature of the hydrocarbon resin. In another embodiment, the composition has a single glass transition temperature intermediate between the glass transition temperature of the hydrocarbon resin and the polymer described above. In yet another embodiment, the composition has a glass transition temperature by DSC of 30° C. or lower, 20° C. or lower, 15° C. or lower, 10° C. or lower, 7° C. or lower, 5° C. or lower, 3° C. or lower, or 1° C. or lower. The actual glass transition temperature of the blend depends on the composition (the relative amount of the hydrocarbon resins and the polymer) and the glass transition temperature of the individual components. This convergence of the glass transition of the blends from the values of the blend components is described by the Fox Flory relationship.

As will be evident to those skilled in the art, the compositions of the present invention can further include conventional additives to enhance a specific property, or such additives can be present as a result of processing. Additives which may be incorporated include, for example, fire retardants, antioxidants, plasticizers, and pigments. Other additives which may be used include, for example antiblocking agents, coloring agents, stabilizers, and oxidative-, thermal-, and ultraviolet-light-inhibitors. Lubricants, mold release agents, nucleating agents, reinforcements, and fillers (including granular, fibrous, or powder-like) may also be used. Nucleating agents and fillers tend to improve the rigidity of the article. The list described herein is not intended to be inclusive of all types of additives which may be used with the present invention. Those of skill in the art will appreciate that other additives may be used to enhance properties of the composition. As is understood by those skilled in the art, the compositions of the present invention may be modified to adjust the characteristics of the blend as desired.

The compositions of the present invention can be prepared by any procedure that provides an intimate admixture of the various components. For example, the components can be combined by melt pressing the components together on a Carver press to a thickness of about 0.5 mm (19.7 mls) and a temperature of about 180° C., rolling up the resulting slab, folding the ends together, and repeating the pressing, rolling, and folding operation about 10 times. Internal mixers are useful for solution or melt blending. Also, blending at a temperature of about 180° C. to 240° C. in a Brabender Plastograph for about 1 to 20 minutes has been found satisfactory. Still another method that can be used for admixing the components involves blending the polymers in a Banbury internal mixer above the flux temperature of all of the components, for example, at 180° C. for about 5 minutes.

Batch-mixing procedures are typically supplanted by continuous mixing processes in the industry. These processes are well known in the art and include single and twin screw mixing extruders, static mixers for mixing molten polymer streams of low viscosity, impingement mixers, as well as other machines and processes designed to disperse the polymer and resin in intimate contact.

Articles made from the blends of the invention include films obtained by casting or blowing and include those made by post fabrication orientation. Articles of the invention also include fibers and non-woven or woven fabrics made from these fibers. The blends of the invention can also be used for the fabrication of articles by molding. These molding processes include but are not limited to rotomolding, blow molding, slush molding as well as injection molding. The blends of the invention are particularly suited for the fabrication of elastic films and molded articles by molding where the combination of low viscosity and excellent elastic properties are valuable.

Elongation and Tensile Strength

Elongation and tensile strength were measured as described below. The polymers of the current invention have an elongation of greater than 1000%, or greater than 1200%, or greater than 1500%.

Tensile and elongation properties are determined at 20 in/min (51 cm/min) according to the procedure described in ASTM D790. The data is reported in engineering units with no correction to the stress for the lateral contraction in the specimen due to tensile elongation. The tensile and elongation properties of embodiments of our invention are evaluated using dumbbell-shaped samples. The samples are compression molded at 180° C. to 200° C. for 15 minutes at a force of 15 tons (133 kN) into a plaque of dimensions 6 in×6 in (15 cm×15 cm). The cooled plaques are removed and the specimens are removed with a die and tested after approximately 7 days. The elasticity evaluation of the samples is conducted on an Instron 4465, made by Instron Corporation of Canton, Mass. The digital data is collected in a file collected by the Test Works program as commercially available from the Material Testing Service of USA.

Elasticity

Embodiments of our invention are elastic after tensile deformation. The elasticity, represented by the fractional increase in the length of the sample, represented as a percentage of the length of the sample prior to deformation, is measured according to the general procedure ASTM D790. During tensile elongation, the polymer sample is stretched, and the polymer attempts to recover its original dimensions when the stretching force is removed. This recovery is not complete, and the final length of the relaxed sample is slightly longer than that of the original sample. Elasticity is represented by the fractional increase in the length of the sample, expressed as a percentage of the length of the original unstretched sample in that cycle of measurement.

The protocol for measuring the elasticity of the sample consists of prestretching the deformable zone of the dumbbell, i.e., the narrow portion of the specimen, made according to the procedure described above for the measurement of elongation and tensile strength. The deformable zone of the dumbell is stretched by 200% of its original length to prestretch the sample. This prestretching is conducted at a deformation rate of 10 inches (25 cm) per minute. The work, expressed in in.lb. (or joules) is reported as the Energy Loading. The sample is relaxed at the same rate to form an analytical specimen which is a prestretched specimen of the original sample. The energy recovered during the contraction of the sample is expressed as the Energy Unloading in units of in.lb (or joules). The Energy Unloading appears as a negative number to describe energy derived from the sample. In the tables herein, this cycle of deformation and contraction is referred to as Cycle 1. The difference between the Energy Loading and the absolute value of the Energy Unloading is the Lost Energy. A useful comparative measure is the ratio of the Lost energy to the Energy Loading, which is expressed as the % Lost Energy. A second comparative measure is the distension in the length of the polymer sample in the deformable zone at the point in the cycle where the retractive force is zero. The change in the length of the deformable zone expressed as a percentage of the original length is the Tension Set. The purpose of this Cycle 1 cycle is not analytical but rather to precondition the sample for the actual analysis which is done in Cycle 2. The length of the sample after Cycle 1 is denoted $d_1$. In Cycle 2, the sample is stretched by 200% of its length immediately after Cycle 1 is completed. This stretching is conducted at a deformation rate of 10 inches (25 cm) per minute. The sample is relaxed at the same rate until the contraction force on the sample is zero. The length of the sample when the contraction force on the sample is zero during Cycle 2 is d2, and typically d2 is larger than d1. In Cycle 2 we show data in the tables for energy loading, energy unloading, lost energy and % lost energy which are measured the same way in this cycle as in Cycle 1. The tension set of the sample in Cycle 2 expressed as a percent is calculated as $100*(d_2-d_1)/d_1$.

In one embodiment of the present invention, the compositions described herein have a tension set, as measured by the procedure described above, of less than 50%, or less than 40%, or less than 30%, or less than 25%, or less than 20%, or less than 15%, or less than 12%, or less than 10%, or less than 7%, or less than 5%, or less than 3%.

In another embodiment, the composition can have a tension set TS and a 500% modulus $M_{500\%}$ conforming to the relationship:

$$TS \leq 0.01*M_{500\%}+12.5,$$

where M is in units of psi.

The remarkable elasticity of the blends of the present invention as shown by the low tension set values is also described by remarkable hysteresis properties. Hysteresis is used to describe a behaviour of elastic materials where in a single or multiple cyclic deformation composed of a uniaxial deformation followed by unaxial contraction, as shown above for the determination of tension set, to essentially the same original dimensions, the material does not display identical dynamic properties in the distention and contraction parts of the cycle. Hysteresis properties are quantified using tension set, lost work, and creep. For purposes of the present invention, acceptable hysteresis properties are reflected by low values of all three of the descriptors.

Compositions of the present invention preferably have simultaneously good elastic properties and low tensile modulus. Tensile modulus is a measure of the extensional resistance of the elastic material. A material with a high tensile modulus is hard to deform. For uses such as elastic films and molded or extruded compositions, easy extension of the material is desired, and tensile modulus is therefore preferably low. Low tensile modulus is especially preferred in applications such as elastic materials in diapers, because at high tensile modulus values the retractive force may be large enough to cause discomfort to the wearer. In one embodiment, the composition has a tensile modulus at least 10% lower than the tensile modulus of the polymer. In another embodiment, the composition has a tensile modulus at 500% elongation in the range having an upper limit of 1000 psi, or 800 psi, or 600 psi, or 500 psi, or 400 psi, or 300 psi, or 200 psi and a lower limit of 10 psi, or 20 psi, or 50 psi, or 75 psi, or 100 psi, or 150 psi.

Compositions of the present invention preferably have an essentially invariant tensile modulus over a range of extensions, particularly within the range of 100% to 500% elongation. Constant tensile modulus over a range of extensions is especially desirable for elastic materials in diapers and similar applications, because the users of diapers and other materials expect such materials to have a constant retractive force.

Film

One embodiment of the present invention provides a monolayer or multilayer film including any of the inventive compositions described herein.

The films of the present invention may be used in a variety of applications. For example, the films are suitable for diaper applications and similar absorbent garments such as incontinence garments.

One embodiment of the present invention includes a garment structure made from or including a film as described herein. In a particular aspect of this embodiment, the garment structure is a diaper or an incontinence garment. Garments, such as diaper backsheets, can be formed by adhering the film to a garment substrate.

EXAMPLES

Mooney viscosity, as used herein, is measured as ML(1+4) @ 125° C. according to ASTM D1646.

Heat of fusion ($\Delta H_{fus}$ in the tables herein) and glass transition temperature (Tg in the tables herein) were measured by Differential Scanning Calorimetry (DSC) using the ASTM E-794–95 procedure. The analyses were conducted on a Pyris 1 instrument using the accompanying software available form Perkin Elmer Instruments, USA. All measurements were conducted during the first heating cycle between −100° C. and +150° C. on a sample that had been molded at 200° C. and allowed to anneal at room temperature for approximately 7 days. The first heating cycle was run at a temperature ramp rate of 20° C./min. The heat of fusion is measured from the total area under the peak curve in the region of room temperature to 105° C. The glass transition temperature is the interpolated midpoint of the inflection point in the DSC trace corresponding to the largest change in the heat capacity of the sample.

Tensile and elongation properties are determined at 20 in/min (51 cm/min) according to the procedure described in ASTM D790. The data is reported in engineering units with no correction to the stress for the lateral contraction in the specimen due to tensile elongation. The tensile and elongation properties of embodiments of our invention are evaluated using dumbbell-shaped samples. The samples are compression molded at 180° C. to 200° C. for 15 minutes at a force of 15 tons (133 kN) into a plaque of dimensions 6 in×6 in (15 cm×15 cm). The cooled plaques are removed and the specimens are removed with a die and tested after approximately 7 days.

In the Examples below, Tensile Modulus at a particular elongation is abbreviated as $M_{x\%}$, where X is the elongation. Thus, $M_{50\%}$, $M_{100\%}$, $M_{200\%}$ and $M_{500\%}$ indicate the Tensile Modulus as 50%, 100%, 200% and 500%, respectively. Tensile Modulus is reported in units of psi and MPa. The ratio of Tensile Modulus at 500% to Tensile Modulus at 100% is denoted $M_{500\%}/M_{100\%}$, and is dimensionless.

Tension set is measured according to the general procedure ASTM D790, and is conducted on an Instron 4465, made by Instron Corporation of Canton, Mass. The elasticity of the samples is expressed as a percent of the length of the original un-stretched sample.

Flexural modulus is measured in accordance with ASTM D790, using a Type IV dogbone at crosshead speed of 0.05 in/min (1.3 mm/min).

MFR at 230° C. is determined according to the procedure of ASTM D1238 Procedure A (230° C., 2.16 kg).

The polymer components used in the following examples are described in Table 1.

TABLE 1

| POLYMER | Mooney Viscosity ML(1 + 4)@125° C. | wt % $C_2$ | 7 Day $\Delta H_{fus}$ (J/g) |
|---|---|---|---|
| Polymer-A | 24 | 16.2 | * |
| Polymer-B | 22 | 16.0 | * |
| Polymer-C | 22 | 15.9 | * |
| Polymer-D | 20.2 | 19.1 | 1.467 |
| Polymer-E | 24.8 | 16.8 | 4.5 |
| Polymer-F | 24.4 | 16.8 | 3.589 |
| Polymer-G | 22 | 16.2 | 4.186 |
| Polymer-H | 21.9 | 15.3 | 10.382 |
| Polymer-I | 19.8 | 15.6 | 8.78 |
| Polymer-J | 18.2 | 14.8 | 13.728 |
| Polymer-H | 24 | 16.4 | * |
| TOPAS | Topas 8007 D62 from Targor | | |
| PS | Atactic polystyrene Dow Chemical Co, Midland, MI | | |
| IPP | Isotactic polypropylene ESC4292 from ExxonMobil Chemical Co., Houston, TX | | |

* not measured

Polymers A–H are ethylene-propylene random copolymer having the indicated weight percents of ethylene-derived units, and the balance of propylene-derived units, prepared using a metallocene catalyst system.

Example 1

Samples 1–7

Seven polymer blends were made by melt blending polymer-A with hydrocarbon resin EMPR 103 in the proportions indicated in Table 2, at 175° C.–225° C. in a 250 cm³ Brabender internal mixer. The blends were then fabricated into compression molded plaques and tested after approximately 7 days. Mechanical and hysteresis properties of the seven samples were measured, and are reported in Tables 3 and 4, respectively.

Example 1 shows that the incorporation of hydrocarbon resins into polymer-A leads to a lowering of the tensile modulus without significant change in any of the other properties, such as tensile elongation and elastic recovery.

TABLE 2

| | Composition | |
|---|---|---|
| Sample # | polymer-A (wt %) | EMPR 103 (wt %) |
| 1 | 90 | 10 |
| 2 | 96 | 4 |
| 3 | 84 | 16 |
| 4 | 76 | 24 |
| 5 | 100 | 0 |
| 6 | 64 | 36 |
| 7 | 52 | 48 |

TABLE 3

Mechanical and Thermal Properties

| Sample # | $M_{50\%}$ (psi (MPa)) | $M_{100\%}$ (psi (MPa)) | $M_{200\%}$ (psi (MPa)) | $M_{500\%}$ (psi (MPa)) | $\frac{M_{500\%}}{M_{100\%}}$ | Tg (° C.) |
|---|---|---|---|---|---|---|
| 1 | 185 (1.28) | 216 (1.49) | 243 (1.68) | 436 (3.01) | 2.02 | −26.9 |
| 2 | 207 (1.43) | 247 (1.70) | 284 (1.96) | 540 3.72) | 2.18 | −24.0 |
| 3 | 159 (1.10) | 186 (1.28) | 210 (1.45) | 352 (2.43) | 1.89 | −20.6 |
| 4 | 136 (0.938) | 162 (1.12) | 184 (1.27) | 276 1.90) | 1.70 | −17.4 |
| 5 | 277 (1.91) | 312 (2.15) | 337 (2.32) | 613 (4.23) | 1.96 | −28.7 |
| 6 | 137 (0.945) | 162 (1.12) | 187 (1.29) | 257 1.77) | 1.58 | −10.9 |
| 7 | 111 (0.765) | 127 (0.876) | 148 (1.02) | 232 1.60) | 1.82 | 2.7 |

TABLE 4

Hysteresis Properties

| | Cycle 1 | | | | | Cycle 2 | | | | |
|---|---|---|---|---|---|---|---|---|---|---|
| Sample # | Energy Loading (in. lb.(mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 1 | 18.9 (2140) | −10.56 (−1193)) | 8.34 (942) | 44.13 | 15.3 | 14.24 (1609) | −11.18 (−1263) | 3.06 (346) | 21.5 | 7.3 |
| 2 | 17.73 (2003) | −10.36 (−1171) | 7.37 (833) | 41.6 | 13.2 | 13.60 (1537) | −11.05 (−1249) | 2.55 (288) | 18.8 | 6 |
| 3 | 13.36 (1510) | −8.38 (−947) | 4.98 (563) | 37.3 | 13.6 | 10.77 (1217) | −8.76 (−990) | 2.01 (227) | 18.7 | 6.4 |
| 4 | 12.81 (1448) | −7.64 (−863) | 5.17 ()584) | 40.4 | 14.1 | 9.95 (1120) | −8.13 (−919) | 1.82 (206) | 18.3 | 6.8 |
| 5 | 19.97 (2257) | −11.25 (−1271) | 8.72 (985) | 43.7 | 15.32 | 15.33 (1732) | −11.88 (−1342) | 3.45 (390) | 22.50 | 7.34 |
| 6 | 8.8 (990) | −5 (−560) | 3.8 (430) | 43.2 | 18.6 | 7.3 (820) | −5.5 (−620) | 1.8 (200) | 24.7 | 12.5 |
| 7 | 6.5 (730) | −2.6 (−290) | 3.9 (440) | 60.0 | 46.4 | 6.5 (730) | −3.3 (−370) | 3.2 (360) | 49.2 | 47.6 |

Example 2

Samples 8–12

Polymer blends were made by melt blending polymer-A with isotactic polypropylene ("iPP") in the proportions indicated in Table 5, at 175° C.–225° C. in a 250 cm³ Brander internal mixer. The blends were then fabricated into compression molded plaques and tested after approximately 7 days. Mechanical and hysteresis properties of the seven samples were measured, and are reported in Tables 6 and 7, respectively.

Example 2 shows that the addition of iPP into polymer-A leads to increased tensile modulus.

TABLE 5

| | Composition | |
|---|---|---|
| Sample # | polymer-A (wt %) | iPP (wt %) |
| 8 | 100 | 0 |
| 9 | 90 | 10 |
| 10 | 96 | 4 |
| 11 | 84 | 16 |
| 12 | 76 | 24 |

TABLE 6

Mechanical Properties

| Sample # | $M_{50\%}$ (psi (MPa)) | $M_{100\%}$ (psi (MPa)) | $M_{200\%}$ (psi (MPa)) | $M_{500\%}$ (psi (MPa)) | $\dfrac{M_{500\%}}{M_{100\%}}$ |
|---|---|---|---|---|---|
| 8 | 277 (1.91) | 312 (2.15) | 337 (2.32) | 613 (4.23) | 1.96 |
| 9 | 313 (2.16) | 342 (2.36) | 396 (2.73) | 803 (5.54) | 2.35 |
| 10 | 273 (1.88) | 299 (2.06) | 325 (2.24) | 634 (4.37) | 2.12 |
| 11 | 345 (2.38) | 378 (2.61) | 461 (3.18) | 914 (6.30) | 2.42 |
| 12 | 534 (3.68) | 624 (4.30) | 811 (5.59) | 1343 (9.260) | 2.15 |

TABLE 7

Hysteresis Properties

| | Cycle 1 | | | | | Cycle 2 | | | | |
|---|---|---|---|---|---|---|---|---|---|---|
| Sample # | Energy Loading (in. lb.(mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 8 | 19.97 (2257) | −11.25 (−1271) | 8.72 (985) | 43.7 | 15.32 | 15.33 (1732) | −11.88 (−1342) | 3.45 (390) | 22.5 | 7.341 |
| 9 | 28.0 (3160) | −12.5 (−1410) | 15.5 (1750) | 55.4 | 18.2 | 19.0 (2150) | −12.4 (−1400) | 6.6 (750) | 34.7 | 9.51 |
| 10 | 23.2 (2620) | −11.7 (−1320) | 11.5 (1300) | 49.6 | 17.7 | 16.8 (1900) | −12.1 (−1370) | 4.7 (530) | 28.0 | 8.81 |
| 11 | 30.5 (3450) | −13.4 (−1510) | 17.1 (1930) | 56.1 | 19.1 | 21.4 (2420) | −13.9 (−1570) | 7.5 (850) | 35.0 | 10.91 |
| 12 | 50.4 (5700) | −15.4 (−1740) | 35.0 (3960) | 69.4 | 28.5 | 34.2 (3860) | −16.0 (−1810) | 18.2 (2060) | 53.2 | 22.7 |

Figure 2:
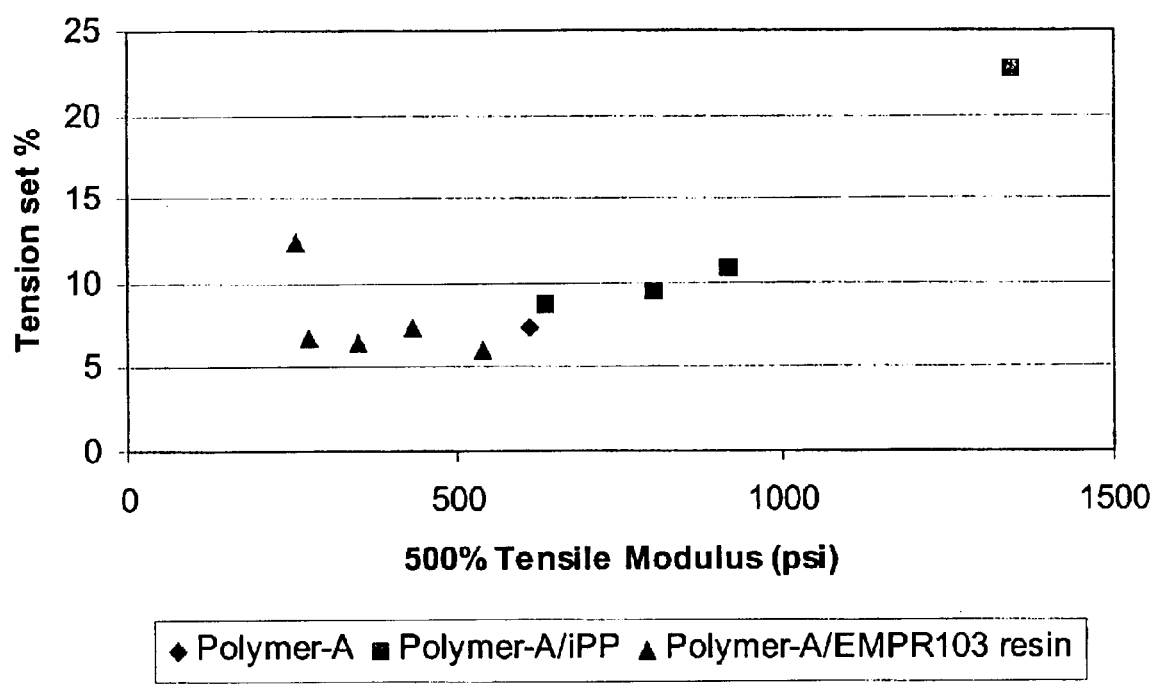
FIGS. 2 and 4 are graphs of the tension set versus 500% tensile modulus of several comparative and inventive films.
Figure 3:
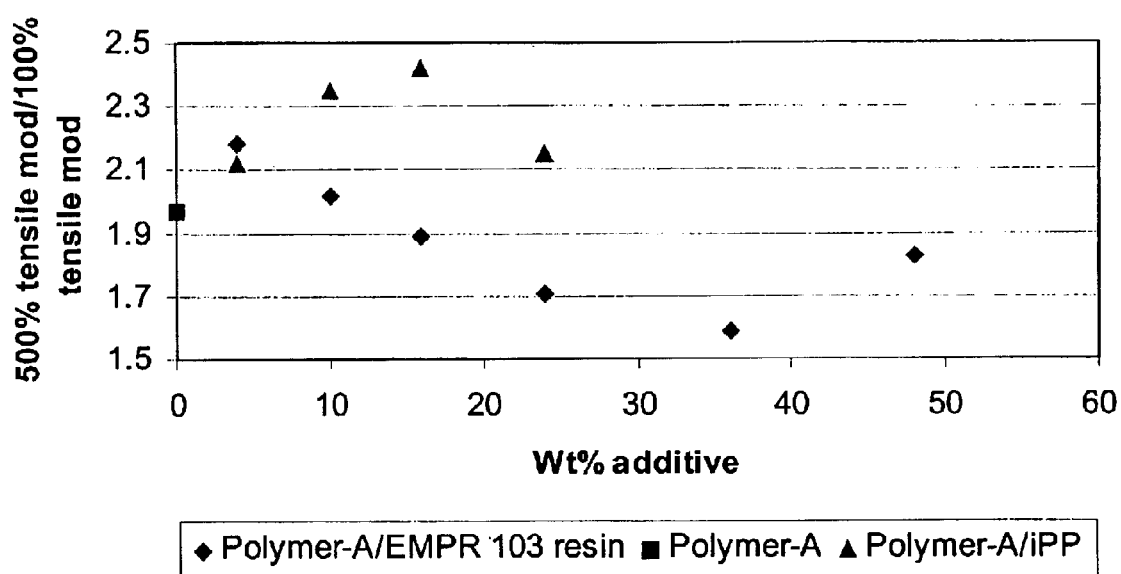
FIGS. 3 and 5 are graphs of 500% tensile modulus/100% tensile modulus versus wt % of additive of several comparative and inventive films.

FIGS. 1, 2, and 3 illustrate the effect of adding EMPR 103 versus iPP to the polymer composition.

Example 3

Samples 13–16

Polymer blends were made by melt blending polymer-B with hydrocarbon resin EMPR 100A in the proportions indicated in Table 8, at 175° C.–225° C. in a 250 cm³ Brabender internal mixer. The blends were then fabricated into compression molded plaques and tested after approximately 7 days. Mechanical and hysteresis properties of the seven samples were measured, and are reported in Tables 9 and 10, respectively.

TABLE 8

Composition

| Sample # | polymer-B (wt %) | EMPR 100A (wt %) |
|---|---|---|
| 13 | 90 | 10 |
| 14 | 96 | 4 |
| 15 | 84 | 16 |
| 16 | 76 | 24 |

TABLE 9

Mechanical Properties

| Sample # | $M_{50\%}$ (psi (MPa)) | $M_{100\%}$ (psi (MPa)) | $M_{200\%}$ (psi (MPa)) | $M_{500\%}$ (psi (MPa)) | $\dfrac{M_{500\%}}{M_{100\%}}$ |
|---|---|---|---|---|---|
| 13 | 158 (1.09) | 179 (1.23) | 186 (1.28) | 253 (1.74) | 1.41 |
| 14 | 183 (1.26) | 206 (1.42) | 214 (1.48) | 289 (1.99) | 1.41 |
| 15 | 91 (0.63) | 106 (0.731) | 109 (0.752) | 109 (0.752) | 1.03 |
| 16 | 77 (0.53) | 93 (0.64) | 99 (0.68) | 92 (0.63) | 0.99 |

TABLE 10

| | Cycle 1 | | | | | Cycle 2 | | | | |
|---|---|---|---|---|---|---|---|---|---|---|
| Sample # | Energy Loading (in. lb.(mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 13 | 11.1 (1250) | −7.6 (−860) | 3.5 (400) | 31.5 | 16.1 | 10.0 (1130) | −8.1 (−920) | 1.9 (210) | 19.0 | 7.8 |
| 14 | 10.9 (1230) | −5.2 (−590) | 5.7 (640) | 52.3 | 18.5 | 10.5 (1190) | −8.5 (−960) | 2.0 (230) | 19.0 | 9.2 |
| 15 | 7.4 (840) | −4.0 (−450) | 3.4 (380) | 45.9 | 26.3 | 6.4 (720) | −4.5 (−510) | 1.9 | 29.7 | 9.1 |
| 16 | 4.5 (510) | −2.6 (−290) | 1.9 (210) | 42.2 | 36.6 | 4.1 (460) | −2.6 (−290) | 1.5 (170) | 36.6 | 27.7 |

Figure 4:
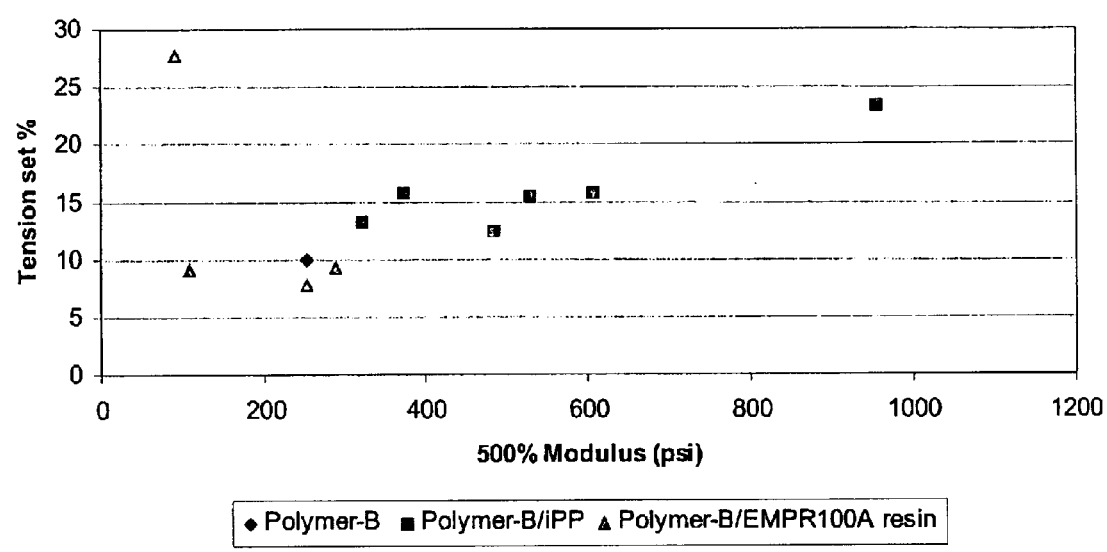
Figure 5:
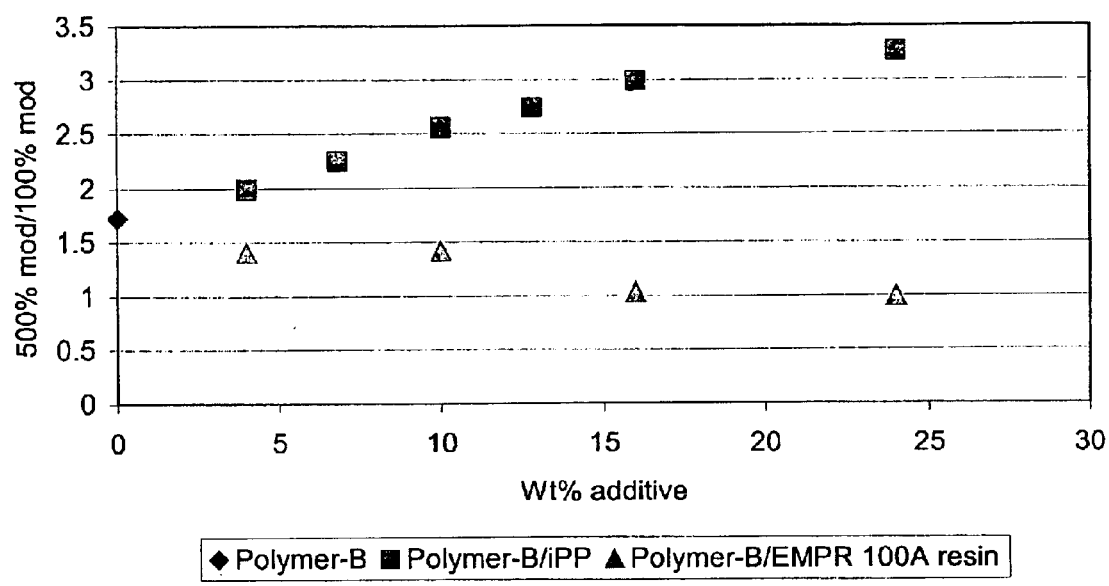

FIGS. 4, 5, and 6 illustrate the effect of adding EMPR 100A versus iPP to the polymer composition.

Example 4

Examples 17–25

Polymer blends were made by melt blending polymer-A with hydrocarbon resin EMPR 103 and iPP in the proportions indicated in Table 11, at 175° C.–225° C. in a 250 cm³ Brabender internal mixer. The blends were then fabricated into compression molded plaques and tested after approximately 7 days. Mechanical and hysteresis properties of the seven samples were measured, and are reported in Tables 12 and 13, respectively.

TABLE 11

| | Composition | | |
|---|---|---|---|
| Sample # | polymer-A (wt %) | EMPR 103 (wt %) | iPP (wt %) |
| 17 | 80 | 4 | 16 |
| 18 | 72 | 4 | 24 |
| 19 | 88 | 4 | 8 |
| 20 | 84 | 10 | 6 |
| 21 | 78 | 10 | 12 |
| 22 | 72 | 10 | 18 |
| 23 | 80 | 16 | 4 |
| 24 | 76 | 16 | 8 |
| 25 | 72 | 16 | 12 |

TABLE 12

| | Mechanical Properties | | | | |
|---|---|---|---|---|---|
| Sample # | $M_{50\%}$ (psi (MPa)) | $M_{100\%}$ (psi (MPa)) | $M_{200\%}$ (psi (MPa)) | $M_{500\%}$ (psi (MPa)) | $\frac{M_{500\%}}{M_{100\%}}$ |
| 17 | 328 (2.26) | 371 (2.56) | 468 (3.23) | 947 (6.53) | 2.55 |
| 18 | 457 (3.15) | 640 (4.41) | 735 (5.07) | 1310 (9.03) | 2.05 |
| 19 | 275 (1.90) | 298 (2.05) | 354 (2.44) | 729 (5.03) | 2.45 |
| 20 | 225 (1.55) | 254 (1.75) | 289 (1.99) | 581 (4.01) | 2.29 |
| 21 | 263 (1.81) | 297 (2.05) | 352 (2.43) | 726 (5.01) | 2.44 |
| 22 | 291 (2.01) | 333 (2.30) | 428 (2.95) | 917 (6.32) | 2.75 |
| 23 | 190 (1.31) | 218 (1.50) | 246 (1.70) | 463 (3.19) | 2.12 |
| 24 | 206 (1.42) | 237 (1.63) | 274 (1.89) | 583 (4.02) | 2.46 |
| 25 | 227 (1.57) | 262 (1.81) | 310 (2.14) | 672 (4.63) | 2.56 |

TABLE 13

Hysteresis Properties

| | Cycle 1 | | | | | Cycle 2 | | | | |
|---|---|---|---|---|---|---|---|---|---|---|
| Sample # | Energy Loading (in. lb.(mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 17 | 27.35 (3091) | −12.12 (−1370) | 15.23 (1721) | 55.69 | 18.7 | 19.1 (2160) | −12.6 (−1420) | 6.5 (730) | 34.03 | 10.9 |
| 18 | 38.8 (4380) | −13.1 (−1480) | 25.7 (2900) | 66.24 | 24.4 | 26.5 (3000) | −13.7 (−1550) | 12.8 (1450) | 48.30 | 18.5 |
| 19 | 22.8 (2580) | −11.5 (−1300) | 11.3 (1280) | 49.56 | 17.2 | 16.5 (1860) | −12.0 (−1360) | 4.5 (510) | 27.27 | 8.8 |
| 20 | 19.7 (2230) | −10.4 (−1180) | 9.3 (1050) | 47.21 | 16.3 | 14.4 (1630) | −10.9 (−1230) | 3.5 (400) | 24.30 | 7.6 |
| 21 | 22.3 (2520) | −11.0 (−1240) | 11.3 (1280) | 50.67 | 16.9 | 15.9 (1800) | −11.4 (−1290) | 4.5 (510) | 28.30 | 8.8 |
| 22 | 25.7 (2900) | −11.2 (−1270) | 14.5 (1640) | 56.42 | 17.7 | 17.3 (1950) | −11.4 (−1290) | 5.9 (670) | 34.10 | 11.8 |
| 23 | 16.4 (1850) | −9.0 (−1000) | 7.4 (840) | 45.12 | 16 | 12.3 (1390) | −9.6 (−1100) | 2.7 (300) | 21.95 | 7.4 |
| 24 | 18.3 (2070) | −9.5 (−1100) | 8.8 (990) | 48.09 | 16.7 | 13.28 (1501) | −10.0 (−1130) | 3.28 (371) | 24.69 | 8.5 |
| 25 | 20.2 (2280) | −10.2 (−1150) | 10.0 (1130) | 49.5 | 16.6 | 14.5 (1640) | −10.8 (−1220) | 3.7 (420) | 25.51 | 16.6 |

Example 5

Examples 26–46

Polymer blends were made by melt blending various polymer compositions having different compositions and crystallinities with hydrocarbon resin EMPR 103 in the proportions indicated in Table 14, at 175° C.–225° C. in a 250 cm³ bender internal mixer. The blends were then fabricated into compression molded plaques and tested after approximately 7 days. Mechanical and hysteresis properties of the seven samples were measured, and are reported in Tables 15 and 16, respectively. The "polymer type" indicated in Table 14 corresponds to the designations of Table 1.

TABLE 14

Composition

| | Polymer | | |
|---|---|---|---|
| Sample # | Type (Table 1) | Amount (wt %) | EMPR 103 (wt %) |
| 26 | D | 88 | 12 |
| 27 | D | 84 | 16 |
| 28 | D | 80 | 20 |
| 29 | E | 88 | 12 |
| 30 | E | 84 | 16 |
| 31 | E | 80 | 20 |
| 32 | F | 88 | 12 |
| 33 | F | 84 | 16 |
| 34 | F | 80 | 20 |
| 35 | G | 88 | 12 |
| 36 | G | 84 | 16 |
| 37 | G | 80 | 20 |
| 38 | H | 88 | 12 |
| 39 | H | 84 | 16 |
| 40 | H | 80 | 20 |
| 41 | I | 88 | 12 |
| 42 | I | 84 | 16 |
| 43 | I | 80 | 20 |
| 44 | J | 88 | 12 |
| 45 | J | 84 | 16 |
| 46 | J | 80 | 20 |

TABLE 15

Mechanical and Thermal Properties

| Sample # | $M_{50\%}$ (psi (MPa)) | $M_{100\%}$ (psi (MPa)) | $M_{200\%}$ (psi (MPa)) | $M_{500\%}$ (psi (MPa)) | Elongation (%) | Tensile Strength (psi (MPa)) | Tg (° C.) |
|---|---|---|---|---|---|---|---|
| 26 | 73 (0.50) | 87 (0.60) | 87 (0.60) | 66 (0.46) | 137 | 89 (0.61) | −25.5 |
| 27 | 72 (0.50) | 87 (0.60) | 89 (0.61) | 68 (0.47) | * | 92 (0.63) | −24.7 |
| 28 | 67 (0.46) | 81 (0.56) | 83 (0.57) | 64 (0.44) | 151 | 85 (0.59) | −22.3 |
| 29 | 153 (1.05) | 185 (1.28) | 204 (1.41) | 298 (2.05) | 844 | 967 (6.67) | −22. |

TABLE 15-continued

Mechanical and Thermal Properties

| Sample # | $M_{50\%}$ (psi (MPa)) | $M_{100\%}$ (psi (MPa)) | $M_{200\%}$ (psi (MPa)) | $M_{500\%}$ (psi (MPa)) | Elongation (%) | Tensile Strength (psi (MPa)) | Tg (°C.) |
|---|---|---|---|---|---|---|---|
| 30 | 121 (0.834) | 145 (1.00) | 160 (1.10) | 202 (1.39) | 908 | 640 (4.41) | −22.7 |
| 31 | 113 (0.779) | 137 (0.945) | 153 (1.05) | 187 (1.29) | 887 | 524 (3.61) | −21.2 |
| 32 | 103 (0.710) | 123 (0.848) | 129 (0.889) | 135 (0.931) | 987 | 416 (2.87) | −23.2 |
| 33 | 94 (0.65) | 112 (0.772) | 119 (0.821) | 118 (0.814) | * | 339 (2.34) | −22.1 |
| 34 | 86 (0.59) | 103 (0.710) | 111 (0.765) | 106 (0.731) | * | 277 (1.91) | −20.5 |
| 35 | 113 (0.779) | 133 (0.917) | 141 (0.972) | 158 (1.09) | 907 | 448 (3.09) | −23.5 |
| 36 | 100 (0.690) | 119 (0.821) | 128 (0.883) | 134 (0.924) | 998 | 400 (2.76) | −22.0 |
| 37 | 96 (0.66) | 115 (0.793) | 124 (0.855) | 127 (0.876) | 1000 | 365 (2.52) | −20.1 |
| 38 | 189 (1.30) | 224 (1.54) | 247 (1.70) | 395 (2.72) | 818 | 1201 (8.281) | −22.8 |
| 39 | 167 (1.15) | 199 (1.37) | 221 (1.52) | 326 (2.25) | 848 | 1010 (6.964) | −21.0 |
| 40 | 144 (0.993) | 174 (1.20) | 196 (1.35) | 276 (1.90) | 870 | 838 (5.78) | −19.7 |
| 41 | 175 (1.21) | 207 (1.43) | 228 (1.57) | 336 (2.32) | 855 | 1039 (7.164) | −21.6 |
| 42 | 152 (1.05) | 183 (1.26) | 204 (1.41) | 296 (2.04) | 870 | 895 (6.17) | −20.1 |
| 43 | 131 (0.903) | 157 (1.08) | 176 (1.21) | 237 (1.63) | 903 | 706 (4.87) | −21.2 |
| 44 | 211 (1.46) | 247 (1.70) | 267 (1.84) | 426 (2.94) | 802 | 1245 (8.584) | −20.1 |
| 45 | 191 (1.32) | 226 (1.56) | 248 (1.71) | 382 (2.63) | 831 | 1198 (8.260) | −18.9 |
| 46 | 161 (1.11) | 192 (1.32) | 215 (1.48) | 314 (2.16) | 860 | 954 (6.58) | −18.1 |

* not measured

TABLE 16

Hysteresis Properties

| | Cycle 1 | | | | | Cycle 2 | | | | |
|---|---|---|---|---|---|---|---|---|---|---|
| Sample # | Energy Loading (in. lb. (mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 26 | 4.7 (530) | −1.5 (−170) | 3.2 (360) | 68.1 | 42.7 | 5.0 (560) | −2.7 (−300) | 2.3 (260) | 46.0 | 36.2 |
| 27 | 4.8 (540) | −1.8 (−200) | 3.0 (340) | 62.5 | 41 | 4.9 (550) | −2.8 (−320) | 2.1 (240) | 42.9 | 33.4 |
| 28 | 5.1 (580) | −2.4 (−270) | 2.7 (300) | 52.9 | 40 | 4.6 (520) | −2.7 (−300) | 1.9 (210) | 41.3 | 32.5 |
| 29 | 13.3 (1500) | −8.6 (−970) | 4.7 (530) | 35.3 | 15 | 11.0 (1240) | −9.3 (−1050) | 1.7 (190) | 15.5 | 5.3 |
| 30 | 11.3 (1280) | −7.1 (−800) | 4.2 (470) | 37.2 | 17.3 | 9.5 (930) | −7.6 (−860) | 1.9 (210) | 20.0 | 8.5 |
| 31 | 9.6 (1100) | −6.0 (−680) | 3.6 (410) | 37.5 | 17.2 | 8.2 (930) | −6.4 (−720) | 1.8 (200) | 22.0 | 8.5 |
| 32 | 9.1 (1000) | −4.9 (−550) | 4.2 (470) | 46.2 | 25 | 7.8 (880) | −5.6 (−630) | 2.2 (250) | 28.2 | 17.2 |
| 33 | 8.4 (950) | −4.7 (−530) | 3.7 (420) | 44.0 | 24.4 | 7.0 (790) | −5.1 (−580) | 1.9 (210) | 27.1 | 17.5 |
| 34 | 7.5 (850) | −4.3 (−490) | 3.2 (360) | 42.7 | 24.1 | 6.4 (720) | −5.5 (−620) | 0.9 (100) | 14.1 | 18.1 |
| 35 | 9.9 (1100) | −5.5 (−620) | 4.4 (500) | 44.4 | 22.6 | 8.2 (930) | −6.0 (−680) | 2.2 (250) | 26.8 | 16 |
| 36 | 8.6 (970) | −4.7 (−530) | 3.9 (440) | 45.3 | 23.1 | 7.2 (810) | −5.3 (−600) | 1.9 (210) | 26.4 | 16.7 |

TABLE 16-continued

Hysteresis Properties

| | Cycle 1 | | | | | Cycle 2 | | | | |
|---|---|---|---|---|---|---|---|---|---|---|
| Sample # | Energy Loading (in. lb. (mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 37 | 8.6 (970) | −4.9 (−550) | 3.7 (420) | 43.0 | 21.9 | 7.1 (800) | −5.3 (−600) | 1.8 (200) | 25.4 | 15.2 |
| 38 | 16.3 (1840) | −10.2 (−1150) | 6.1 (690) | 37.4 | 13.3 | 12.7 (1430) | −10.7 (−1210) | 2.0 (230) | 15.7 | 4.5 |
| 39 | 14.2 (1600) | −8.9 (−1000) | 5.3 (600) | 37.3 | 13.7 | 11.2 (1270) | −9.4 (−1060) | 1.8 (200) | 16.1 | 5 |
| 40 | 12.3 (1390) | −7.7 (−870) | 4.6 (520) | 37.4 | 14.3 | 10.0 (1130) | −8.3 (−940) | 1.7 (190) | 17.0 | 5.9 |
| 41 | 14.8 (1670) | −8.9 (−1000) | 5.9 (670) | 39.9 | 14.1 | 11.6 (1310) | −9.7 (−1100) | 1.9 (210) | 16.4 | 5.6 |
| 42 | 12.6 (1420) | −7.8 (−880) | 4.8 (540) | 38.1 | 14.3 | 9.9 (1100) | −8.3 (−940) | 1.6 (180) | 16.2 | 5.8 |
| 43 | 11.0 (1240) | −6.5 (−730) | 4.5 (510) | 40.9 | 15.3 | 8.7 (980) | −7.0 (−790) | 1.7 (190) | 19.5 | 7.1 |
| 44 | 17.0 (1920) | −9.8 (−1110) | 7.2 (810) | 42.4 | 14.4 | 12.8 (1450) | −10.6 (−1200) | 2.2 (250) | 17.2 | 5.6 |
| 45 | 15.9 (1800) | −9.4 (−1060) | 6.5 (730) | 40.9 | 13.3 | 12.1 (1370) | −10.1 (−1140) | 2.0 (230) | 16.5 | 4.8 |
| 46 | 14.0 (1580) | −8.3 (−940) | 5.7 (640) | 40.7 | 13.5 | 10.7 (1210) | −8.8 (−990) | 1.9 (210) | 17.8 | 5.4 |

Example 6

Samples 47–58

Polymer blends were made by melt blending various polymer compositions having different compositions and crystallinities with hydrocarbon resin EMPR 100 in the proportions indicated in Table 17, at 175° C.–225° C. in a 250 cm³ Brabender internal mixer. The blends were then fabricated into compression molded plaques and tested after approximately 7 days. Mechanical and hysteresis properties of the seven samples were measured, and are reported in Tables 18 and 19, respectively. The "polymer type" indicated in Table 17 corresponds to the designations of Table 1.

TABLE 17

| | Composition | | |
|---|---|---|---|
| | Polymer | | |
| Sample # | Type (Table 1) | Amount (wt %) | EMPR 100 (wt %) |
| 47 | D | 88 | 12 |
| 48 | D | 84 | 16 |
| 49 | D | 80 | 20 |
| 50 | F | 88 | 12 |
| 51 | F | 84 | 16 |
| 52 | F | 80 | 20 |
| 53 | I | 88 | 12 |
| 54 | I | 84 | 16 |
| 55 | I | 80 | 20 |
| 56 | J | 88 | 12 |
| 57 | J | 84 | 16 |
| 58 | J | 80 | 20 |

TABLE 18

Mechanical and Thermal Properties

| Sample # | Flex. Modulus 1% secant (psi (MPa)) | $M_{50\%}$ (psi (MPa)) | $M_{100\%}$ (psi (MPa)) | $M_{200\%}$ (psi (MPa)) | $M_{500\%}$ (psi (MPa)) | Elongation (%) | Tensile Strength (psi (MPa)) | Tg (° C.) |
|---|---|---|---|---|---|---|---|---|
| 47 | 417 (2.88) | 65.9 (0.454) | 80.5 (0.555) | 80.1 (0.552) | 57.7 (0.398) | 133 | 83.1 (0.573) | −25.1 |
| 48 | 390 (2.69) | 61.0 (0.421) | 74.3 (0.512) | 74.9 (0.516) | 54.2 (0.374) | 145.1 | 77.2 (0.532) | −23.2 |
| 49 | 365 (2.52) | 58.8 (0.405) | 70.9 (0.489) | 71.7 (0.494) | 53.5 (0.369) | 142.5 | 73.4 (0.506) | −21.6 |
| 50 | 672 (4.63) | 118 (0.814) | 140.7 (0.970) | 154.1 (1.06) | 193.9 (1.34) | 895 | 600 (4.14) | −23.2 |

TABLE 18-continued

Mechanical and Thermal Properties

| Sample # | Flex. Modulus 1% secant (psi (MPa) | $M_{50\%}$ (psi (MPa)) | $M_{100\%}$ (psi (MPa)) | $M_{200\%}$ (psi (MPa)) | $M_{500\%}$ (psi (MPa)) | Elongation (%) | Tensile Strength (psi (MPa)) | Tg (° C.) |
|---|---|---|---|---|---|---|---|---|
| 51 | 620 (4.27) | 118 (0.814) | 141 (0.972) | 154 (1.06) | 193 (1.33) | 895 | 600 (4.14) | −22.1 |
| 52 | 573 (3.95) | 107 (0.738) | 129 (0.889) | 142 (0.979) | 167 (1.15) | 935 | 507 (3.50) | −18.6 |
| 53 | 1067 (7.357) | 173 (1.19) | 199 (1.37) | 216 (1.49) | 313 (2.16) | 857 | 958 (6.61) | −22.4 |
| 54 | 941 (6.49) | 170 (1.17) | 203 (1.40) | 224 (1.54) | 319 (2.20) | 851 | 992 (6.84) | −20.9 |
| 55 | 727 (5.01) | 130 (0.896) | 157 (1.08) | 177 (1.22) | 245 (1.69) | 881 | 724 (4.99) | −19.3 |
| 56 | 1275 (8.791) | 205 (1.41) | 239 (1.65) | 257 (1.77) | 411 (2.83) | 820 | 1316 (9.074) | −21.5 |
| 57 | 1080 (7.447) | 180 (1.24) | 214 (1.48) | 236 (1.63) | 363 (2.50) | 835 | 1149 (7.922) | −20.1 |
| 58 | 943 (6.50) | 157 (1.08) | 188 (1.30) | 211 (1.45) | 310 (2.14) | 863 | 948 (6.54) | −19.3 |

TABLE 19

Hysteresis Properties

| | Cycle 1 | | | | | Cycle 2 | | | | |
|---|---|---|---|---|---|---|---|---|---|---|
| Sample # | Energy Loading (in. lb. (mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 47 | 4.5 (510) | −1.77 (−200) | 2.73 (308) | 60.7 | 46.4 | 3.9 (440) | −2.0 (−230) | 1.9 (210) | 48.7 | 62.4 |
| 48 | 3.9 (440) | −1.44 (−163) | 2.46 (278) | 63.1 | 48.0 | 3.9 (440) | −2.13 (−241) | 1.77 (200) | 45.4 | 61.1 |
| 49 | 3.7 (420) | −1.48 (−167) | 2.22 (251) | 60.0 | 44.1 | 3.63 (410) | −2.8 (−320) | 0.83 (94) | 22.9 | 36.3 |
| 50 | 10.8 (1220) | −6.8 (−770) | 4.0 (450) | 37.0 | 17.8 | 9.16 (1040) | −7.45 (−842) | 1.71 (196) | 18.7 | 8 |
| 51 | 9.8 (1100) | −6.1 (−690) | 3.7 (420) | 37.8 | 19.2 | 8.5 (960) | −6.84 (−773) | 1.66 (188) | 19.5 | 9.5 |
| 52 | 9.28 (1050) | −5.82 (−658) | 3.46 (391) | 37.3 | 18.5 | 7.86 (888) | −6.23 (−704) | 1.63 (184) | 20.7 | 9.88 |
| 53 | 14.5 (1640) | −8.68 (−981) | 5.82 (658) | 40.1 | 13.7 | 11.2 (1270) | −9.26 (−1050) | 1.94 (219) | 17.3 | 5.0 |
| 54 | 14.62 (1652) | −9.11 (−1030) | 5.51 (623) | 37.7 | 13.8 | 11.39 (1287) | −9.67 (−1090) | 1.72 (194) | 15.1 | 5.04 |
| 55 | 10.74 (1214) | −6.58 (−744) | 4.16 (470) | 38.7 | 15.7 | 8.66 (979) | −7.05 (−797) | 1.61 (182) | 18.6 | 7.38 |
| 56 | 17.03 (1924) | −10.04 (−1135) | 6.99 (790) | 41.0 | 14.46 | 12.89 (1457) | −10.57 (−1194) | 2.32 (262) | 18.0 | 5.27 |
| 57 | 15.31 (1730) | −9.28 (−1050) | 6.03 (681) | 39.4 | 14.22 | 11.83 (1337) | −9.82 (−1110) | 2.01 (227) | 17.0 | 5.12 |
| 58 | 13.32 (1505) | −7.97 (−901) | 5.35 (605) | 40.2 | 14.03 | 10.23 (1156) | −8.35 (−944) | 1.88 (212) | 18.4 | 5.72 |

Example 7

Samples 59–70

Polymer blends were made by melt blending various polymer compositions having different compositions and crystallinities with hydrocarbon resin EMPR 104 in the proportions indicated in Table 20, at 175° C.–225° C. in a 250 cm³ Brabender internal mixer. The blends were then fabricated into compression molded plaques and tested after approximately 7 days. Mechanical and hysteresis properties of the seven samples were measured, and are reported in Tables 21 and 22, respectively. The "polymer type" indicated in Table 20 corresponds to the designations of Table 1.

TABLE 20

| | Composition | | |
|---|---|---|---|
| | Polymer | | |
| Sample # | Type (Table 1) | Amount (wt %) | EMPR 104 (wt %) |
| 59 | D | 88 | 12 |
| 60 | D | 84 | 16 |

TABLE 20-continued

Composition

| Sample # | Polymer Type (Table 1) | Polymer Amount (wt %) | EMPR 104 (wt %) |
|---|---|---|---|
| 61 | D | 80 | 20 |
| 62 | F | 88 | 12 |
| 63 | F | 84 | 16 |
| 64 | F | 80 | 20 |
| 65 | I | 88 | 12 |
| 66 | I | 84 | 16 |
| 67 | I | 80 | 20 |
| 68 | J | 88 | 12 |
| 69 | J | 84 | 16 |
| 70 | J | 80 | 20 |

TABLE 21

Mechanical and Thermal Properties

| Sample # | Flex. Modulus 1% secant (psi (MPa) | $M_{50\%}$ (psi (MPa)) | $M_{100\%}$ (psi (MPa)) | $M_{200\%}$ (psi (MPa)) | $M_{500\%}$ (psi (MPa)) | Elongation (%) | Tensile Strength (psi (MPa)) | Tg (° C.) |
|---|---|---|---|---|---|---|---|---|
| 59 | 260 (1.79) | 60 (0.41) | 74 (0.51) | 74 (0.51) | 52 (0.36) | 138 | 76 (0.52) | −26.6 |
| 60 | 321 (2.21) | 56 (0.39) | 71 (0.49) | 71 (0.49) | 52 (0.36) | 145 | 73 (0.50) | −24.3 |
| 61 | 239 (1.65) | 50 (0.34) | 65 (0.45) | 66 (0.46) | 50 (0.34) | 147 | 67 (0.46) | −23.6 |
| 62 | 839 (5.78) | 137 (0.945) | 167 (1.15) | 185 (1.28) | 253 (1.74) | 868 | 848 (5.85) | −23.9 |
| 63 | 636 (4.39) | 106 (0.731) | 133 (0.917) | 149 (1.03) | 183 (1.26) | 920 | 590 (4.07) | −22 |
| 64 | 563 (3.88) | 100 (0.690) | 125 (0.862) | 140 (0.965) | 169 (1.16) | 922 | 515 (3.55) | −20.5 |
| 65 | 987 (6.81) | 159 (1.10) | 191 (1.32) | 212 (1.46) | 323 (2.23) | 848 | 1018 (7.019) | −23.2 |
| 66 | 779 (5.37) | 140 (0.965) | 170 (1.17) | 192 (1.32) | 280 (1.93) | 865 | 868 (5.98) | −21.6 |
| 67 | 736 (5.07) | 119 (0.821) | 147 (1.01) | 173 (1.19) | 245 (1.69) | 857 | 675 (4.65) | −20.1 |
| 68 | 1391 (9.591) | 208 (1.43) | 244 (1.68) | 264 (1.82) | 437 (3.01) | 807 | 1423 (9.812) | −22.4 |
| 69 | 1178 (8.122) | 180 (1.24) | 216 (1.49) | 239 (1.65) | 376 (2.59) | 828 | 1228 (8.467) | −21.2 |
| 70 | 972 (6.70) | 156 (1.08) | 188 (1.30) | 211 (1.45) | 323 (2.23) | 849 | 1020 (7.033) | −18.9 |

TABLE 22

Hysteresis Properties

| Sample # | Cycle 1 Energy Loading (in. lb. (mJ)) | Cycle 1 Energy Unloading (in. lb. (mJ)) | Cycle 1 Lost Energy (in. lb. (mJ)) | Cycle 1 Lost Energy (%) | Cycle 1 Tension Set (%) | Cycle 2 Energy Loading (in. lb. (mJ)) | Cycle 2 Energy Unloading (in. lb. (mJ)) | Cycle 2 Lost Energy (in. lb. (mJ)) | Cycle 2 Lost Energy (%) | Cycle 2 Tension Set (%) |
|---|---|---|---|---|---|---|---|---|---|---|
| 59 | 4.04 (457) | −1.46 (−165) | 2.58 (292) | 63.9 | 47.6 | 3.83 (433) | −1.91 (−216) | 1.92 (217) | 50.1 | 42 |
| 60 | 3.86 (436) | −1.28 (−145) | 2.58 (292) | 66.8 | 46.77 | 3.83 (433) | −1.91 (−216) | 1.92 (217) | 50.1 | 41 |
| 61 | 3.32 (375) | −1.11 (−125) | 2.21 (250) | 66.6 | 49.06 | 3.68 (416) | −1.96 (−221) | 1.72 (194) | 46.7 | 40.96 |
| 62 | 11.74 (1327) | −7.55 (−853) | 4.19 (473) | 35.7 | 16.27 | 9.83 (1110) | −8.29 (−937) | 1.54 (174) | 15.7 | 6.21 |
| 63 | 9.33 (1050) | −5.88 (−664) | 3.45 (390) | 37.0 | 19.44 | 8.06 (911) | −6.45 (−729) | 1.61 (182) | 20.0 | 9.06 |
| 64 | 8.62 (974) | −5.33 (−602) | 3.29 (372) | 38.2 | 20.13 | 7.47 (844) | −5.86 (−662) | 1.61 (182) | 21.6 | 10.19 |

TABLE 22-continued

Hysteresis Properties

| | Cycle 1 | | | | | Cycle 2 | | | | |
|---|---|---|---|---|---|---|---|---|---|---|
| Sample # | Energy Loading (in. lb. (mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 65 | 13.21 (1493) | −8.10 (−915) | 5.11 (577) | 38.7 | 14.85 | 10.51 (1188) | −8.78 (−992) | 1.73 (195) | 16.5 | 5.74 |
| 66 | 11.95 (1350) | −7.37 (−833) | 4.58 (518) | 38.3 | 15.65 | 9.63 (1090) | −7.96 (−899) | 1.67 (189) | 17.3 | 6.241 |
| 67 | 10.60 (1198) | −6.34 (−716) | 4.26 (481) | 40.2 | 16.20 | 8.54 (965) | −6.92 (−782) | 1.62 (183) | 19.0 | 7.37 |
| 68 | 16.91 (1911) | −9.77 (−1100) | 7.14 (807) | 42.2 | 15.36 | 12.9 (1460)1 | −10.6 (−1199)1 | 2.30 (260) | 17.8 | 5.96 |
| 69 | 14.97 (1692) | −8.93 (−1010) | 6.04 (683) | 40.3 | 14.83 | 11.46 (1295) | −9.52 (−1076) | 1.94 (219) | 16.9 | 5.67 |
| 70 | 12.99 (1468) | −7.80 (−881) | 5.19 (586) | 40.0 | 14.87 | 10.19 (1151) | −8.43 (−953) | 1.76 (199) | 17.3 | 6.18 |

Example 8

Samples 71–82

Polymer blends were made by melt blending polymer-H with various resins in the proportions indicated in Table 23, at 175° C.–225° C. in a 250 cm³ Brabender internal mixer. The blends were then fabricated into compression molded plaques and tested after approximately 7 days. Mechanical and hysteresis properties of the seven samples were measured, and are reported in Tables 24 and 25, respectively. In Table 23, TOPAS is a high Tg polymer made with alternating norbornene and ethylene. In Table 24, MFR is the ASTM 1238 Procedure A (230° C., 2.16 kg), Tg and $\Delta H_{fus}$, are first melt values, and Flex Modules is the 1% secant value.

TABLE 23

Composition

| Sample # | polymer-H (wt %) | Polystyrene (wt %) | TOPAS (wt %) | EMPR 104 (wt %) | EMPR 100 (wt %) |
|---|---|---|---|---|---|
| 71 | 80 | 0 | 0 | 20 | 0 |
| 72 | 80 | 4 | 0 | 16 | 0 |
| 73 | 80 | 8 | 0 | 12 | 0 |
| 74 | 80 | 12 | 0 | 8 | 0 |
| 75 | 80 | 16 | 0 | 4 | 0 |
| 76 | 80 | 20 | 0 | 0 | 0 |
| 77 | 80 | 0 | 0 | 0 | 20 |
| 78 | 80 | 0 | 4 | 0 | 16 |
| 79 | 80 | 0 | 8 | 0 | 12 |
| 80 | 80 | 0 | 12 | 0 | 8 |
| 81 | 80 | 0 | 16 | 0 | 4 |
| 82 | 80 | 0 | 20 | 0 | 0 |

TABLE 24

Mechanical and Thermal Properties

| Sample # | MFR (g/10 min.) | Tg of polymer-H (° C.) | $\Delta H_{fus}$ of polymer-H (J/g) | Flex. Modulus (psi (MPa)) | $M_{50\%}$ (psi (MPa)) | $M_{100\%}$ (psi (MPa)) | $M_{200\%}$ (psi (MPa)) | $M_{500\%}$ (psi (MPa)) | Elasticity (%) | Tensile Strength (psi (MPa)) |
|---|---|---|---|---|---|---|---|---|---|---|
| 71 | 4.76 | −20.2 | 2.6 | 655 (4.52) | 91.5 (0.631) | 111 (0.765) | 119 (0.821) | 123 (0.848) | 984 | 319 (2.20) |
| 72 | 4.59 | −22.2 | 2.7 | 764 (5.27) | 108 (0.745) | 130 (0.896) | 140 (0.965) | 168 (1.16) | 940 | 482 (3.32) |
| 73 | 4.45 | −22.9 | 2.8 | 814 (5.61) | 116 (0.800) | 139 (0.958) | 147 (1.01) | 208 (1.43) | 944 | 593 (4.09) |
| 74 | 4.33 | −25.2 | 3.1 | 910 (6.27) | 131 (0.903) | 151 (1.04) | 158 (1.09) | 255 (1.76) | 909 | 605 (4.17) |
| 75 | 3.98 | −27.2 | 3.6 | 1212 (8.357) | 146 (1.01) | 167 (1.15) | 177 (1.22) | 297 (2.05) | 943 | 711 (4.90) |
| 76 | 3.92 | −29 | 4.7 | 1485 (10.24) | 163 (1.12) | 185 (1.28) | 201 (1.39) | 309 (2.13) | 985 | 772 (5.32) |
| 77 | 4.84 | * | * | 700 (4.83) | 79.1 (0.545) | 94.9 (0.654) | 99.4 (0.685) | 89.7 (0.618) | * | 213 (1.47) |
| 78 | 4.44 | * | * | 826 (5.69) | 100 (0.690) | 118 (0.814) | 122 (0.841) | 130 (0.896) | 972 | 459 (3.16) |
| 79 | 4.25 | * | * | 965 (6.65) | 138 (0.952) | 157 (1.08) | 160 (1.10) | 293 (2.02) | 835 | 1007 (6.943) |
| 80 | 4.22 | * | * | 974 (6.72) | 151 (1.04) | 169 (1.16) | 175 (1.21) | 418 (2.88) | 855 | 1251 (8.626) |
| 81 | 3.87 | * | * | 1168 (8.053) | 167 (1.15) | 185 (1.28) | 198 (1.36) | 560 (3.86) | 798 | 1246 (8.591) |

TABLE 24-continued

Mechanical and Thermal Properties

| Sample # | MFR (g/10 min.) | Tg of polymer-H (° C.) | ΔH$_{fus}$ of polymer-H (J/g) | Flex. Modulus (psi (MPa)) | M$_{50\%}$ (psi (MPa)) | M$_{100\%}$ (psi (MPa)) | M$_{200\%}$ (psi (MPa)) | M$_{500\%}$ (psi (MPa)) | Elasticity (%) | Tensile Strength (psi (MPa)) |
|---|---|---|---|---|---|---|---|---|---|---|
| 82 | 3.73 | * | * | 1450 (9.998) | 204 (1.41) | 222 (1.53) | 255 (1.76) | 867 (5.98) | 694 | 1240 (8.550) |

* not measured

TABLE 25

Hysteresis Properties

| | Cycle 1 | | | | | Cycle 2 | | | | |
|---|---|---|---|---|---|---|---|---|---|---|
| Sample # | Energy Loading (in. lb. (mJ)) | Energy Unloading (in. lb. (mJ)) | Lost Energy (in. lb. (mJ)) | Lost Energy (%) | Tension Set (%) | Energy Loading (in. lb. (mJ)) | Energy Unloading (in. lb. (mJ)) | Lost Energy (in. lb. (mJ)) | Lost Energy (%) | Tension Set (%) |
| 71 | 7.5 (850) | −4.3 (−490) | 3.2 (360) | 42.67 | 24.1 | 6.3 (710) | −4.6 (−520) | 1.7 (190) | 26.98 | 16.6 |
| 72 | 8.8 (990) | −4.8 (−540) | 4.0 (450) | 45.45 | 23.9 | 7.3 (820) | −5.2 (−590) | 2.1 (240) | 28.77 | 16.4 |
| 73 | 8.8 (990) | −4.1 (−460) | 4.7 (530) | 53.41 | 28.0 | 7.8 (880) | −5.3 (−600) | 2.5 (280) | 32.05 | 20.7 |
| 74 | 8.6 (970) | −3.4 (−380) | 5.2 (590) | 60.47 | 33.1 | 8.0 (900) | −5.1 (−580) | 2.9 (330) | 36.25 | 25.7 |
| 75 | 10.2 (1150) | −4.3 (−490) | 5.9 (670) | 57.84 | 28.3 | 8.6 (970) | −5.2 (−590) | 3.4 (380) | 39.53 | 28.3 |
| 76 | 13.1 (1480) | −5.8 (−650) | 7.3 (820) | 55.73 | 35.0 | 10.5 (1190) | −6.3 (−710) | 4.2 (470) | 40 | 27.3 |
| 77 | 5.7 (640) | −2.78 (−314) | 2.92 (330) | 51.2 | 29.77 | 5.4 (610) | −3.69 (−417) | 1.71 (193) | 31.7 | 21.87 |
| 78 | 7.0 (790) | −2.88 (−325) | 4.14 (468) | 59.0 | 21.49 | 7.0 (790) | −4.64 (−524) | 2.36 (267) | 33.7 | 21.49 |
| 79 | 8.9 (1000) | −3.49 (−394) | 5.4 (610) | 60.7 | 24.93 | 8.89 (1000) | −5.09 (−575) | 3.8 (430) | 42.7 | 15.95 |
| 80 | 9.7 (1100) | −3.81 (−431) | 13.53 (1529) | 139.2 | 25.33 | 9.26 (1050) | −6.4 (−720) | 2.86 (323) | 30.9 | 16.67 |
| 81 | 15.6 (1760) | −8.23 (−930) | 7.35 (831) | 47.2 | 21.3 | 11.84 (1338) | −8.34 (−942) | 3.5 (400) | 29.6 | 13.41 |
| 82 | 17.2 (1940) | −8.85 (−1000) | 8.39 (948) | 48.7 | 20.64 | 12.89 (1457) | −9.07 (−1020) | 3.82 (432) | 29.6 | 13.13 |

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

When numerical lower limits and numerical upper limits are listed herein, ranges from any lower limit to any upper limit are contemplated.

What is claimed is:

1. A composition comprising:

(a) from 70% to 95% by weight based on the total weight of the composition of a polymer selected from the group consisting of homopolymers and random copolymers of propylene, the polymer having a heat of fusion as determined by DSC of less than 50 J/g and a melt index (MI) of less than 20 dg/min, and containing stereoregular propylene crystallinity; and (b) from 5% to 30% by weight based on the total weight of the composition of a miscible hydrocarbon resin having a glass transition temperature greater than 20° C. wherein the hydrocarbon resin has a softening point of from 80° C. to 180° C.

2. The composition of claim 1, wherein the composition has a tension set of less than 20%.

3. The composition of claim 1, wherein the composition has a tension set of less than 12%.

4. The composition of claim 1, wherein the composition has a tension set of less than 10%.

5. The composition of claim 1, wherein the composition has a tension set TS and a 500% modulus $M_{500\%}$ conforming to the relationship:

$$TS \leq 0.01 * M_{500\%} + 12.5,$$

where M is in units of psi.

6. The composition of claim 1, wherein the composition has a single glass transition temperature at least 1° C. lower than the glass transition temperature of the hydrocarbon resin.

7. The composition of claim 1, wherein the composition has a tensile modulus at least 10% lower than the tensile modulus of the polymer.

8. The composition of claim 1, wherein the polymer has isotactic stereoregular propylene crystallinity.

9. The composition of claim 1, wherein the polymer is a random copolymer of propylene and at least one comonomer selected from ethylene, $C_4$–$C_{12}$ α-olefins, and combinations thereof.

10. The composition of claim 9, wherein the polymer has a narrow compositional distribution, and a melting point as determined by DSC of from 25° C. to 110° C.

11. The composition of claim 9, wherein the comonomer comprises ethylene.

12. The composition of claim 11, wherein the polymer comprises from 2 wt % to 25 wt % polymerized ethylene units, based on the total weight of the polymer.

13. The composition of claim 1, wherein the polymer has a heat of fusion as determined by DSC of from 1 J/g to 50 J/g.

14. The composition of claim 1, wherein the polymer has a heat of fusion as determined by DSC of from 3 J/g to 10 J/g.

15. The composition of claim 1, wherein the polymer has a melting point as determined by DSC of from 35° C. to 70° C.

16. The composition of claim 1, wherein the polymer has a molecular weight distribution Mw/Mn of from 2.0 to 4.5.

17. The composition of claim 1, wherein the polymer has a melt index (MI) of less than 2 dg/min.

18. The composition of claim 1, wherein the polymer is present in the composition in an amount of from 80 to 95 wt % and the hydrocarbon resin is present in an amount of from 5 to 20 wt %, based on the total weight of the composition.

19. The composition of claim 1, wherein the hydrocarbon resin is a hydrogenated cycloaliphatic resin.

20. The composition of claim 1, wherein the hydrocarbon resin has a molecular weight (Mn) of from 200 to 5000.

21. The composition of claim 1, wherein the hydrocarbon resin has a molecular weight (Mn) of from 200 to 1000.

22. The composition of claim 1, wherein the hydrocarbon resin has a molecular weight (Mn) of from 500 to 1000.

23. The composition of claim 1, wherein the hydrocarbon resin has a softening point of from 120° C. to 150° C.

24. The composition of claim 1, wherein the hydrocarbon resin has a softening point of from 125° C. to 140° C.

25. A composition comprising:
(a) a polymer selected from the group consisting of homopolymers and random copolymers of propylene, wherein the polymer has a heat of fusion as determined by DSC of less than 50 J/g, a melt index (MI) of less than 5 dg/min, and contains stereoregular propylene crystallinity; and
(b) a miscible hydrocarbon resin having a glass transition temperature greater than 200° C. wherein the hydrocarbon resin has a softening point of from 80° C. to 180° C.

26. The composition of claim 25, wherein the polymer is present in the composition in an amount of from 80 to 99 wt % and the hydrocarbon resin is present in an amount of from 1 to 20 wt %, based on the total weight of the composition.

27. The composition of claim 25, wherein the polymer is present in the composition in an amount of from 80 to 99 wt % and the hydrocarbon resin is present in an amount of from 5 to 20 wt %, based on the total weight of the composition.

28. The composition of claim 25, wherein the composition has a tension set of less than 20%.

29. The composition of claim 25, wherein the composition has a tension set of less than 12%.

30. The composition of claim 25, wherein the composition has a tension set of less than 10%.

31. The composition of claim 25, wherein the composition has a tension set TS and a 500% modulus $M_{500\%}$ conforming to the relationship:

$$TS \leq 0.01 * M_{500\%} + 12.5,$$

where M is in units of psi.

32. The composition of claim 25, wherein the composition has single glass transition temperature at least 1° C. lower than the glass transition temperature of the hydrocarbon resin.

33. The composition of claim 25, wherein the composition as a tensile modulus at least 10% lower than the tensile modulus of the polymer.

34. The composition of claim 25, wherein the polymer as isotactic stereoregular propylene crystallinity.

35. The composition of claim 25, wherein the polymer is a random copolymer of propylene and at least one comonomer selected from the group consisting of ethylene, $C_4$–$C_{12}$α-olefins, and combinations thereof.

36. The composition of claim 35, wherein the polymer has a narrow compositional distribution, and a melting point as determined by DSC of from 25° C. to 110° C.

37. The composition of claim 35, wherein the comonomer comprises ethylene.

38. The composition of claim 37, wherein the polymer comprises from 2 wt % to 25 wt % polymerized ethylene units, based on the total weight of the polymer.

39. The composition of claim 25, wherein the polymer has a heat of fusion as determined by DSC of from 1 J/g to 50 J/g.

40. The composition of claim 25, wherein the polymer has a heat of fusion as determined by DSC of from 3 J/g to 10 J/g.

41. The composition of claim 25, wherein the polymer has a melting point as determined by DSC of from 35° C. to 70° C.

42. The composition of claim 25, wherein the polymer has a molecular weight distribution Mw/Mn of from 2.0 to 4.5.

43. The composition of claim 25, wherein the polymer has a melt index (MI) of less than 2 dg/min.

44. The composition of claim 25, wherein the hydrocarbon resin is a hydrogenated cycloaliphatic resin.

45. The composition of claim 25, wherein the hydrocarbon resin has a molecular weight (Mn) of from 200 to 5000.

46. The composition of claim 25, wherein the hydrocarbon resin has a molecular weight (Mn) of from 200 to 1000.

47. The composition of claim 25, wherein the hydrocarbon resin has a molecular weight (Mn) of from 500 to 1000.

48. The composition of claim 25, wherein the hydrocarbon resin has a softening point of from 120° C. to 150° C.

49. The composition of claim 25, wherein the hydrocarbon resin has a softening point of from 125° C. to 140° C.

50. An elastic film comprising a composition, the composition comprising:
(a) a polymer selected from the group consisting of homopolymers and random copolymers of propylene, wherein the polymer has a heat of fusion as determined by DSC of from 1 J/g to 50 J/g, a melt index (MI) of less than 7 dg/min, and contains stereoregular propylene crystallinity; and
(b) a miscible hydrocarbon resin with a glass transition temperature greater than 20° C. wherein the hydrocarbon resin has a softening point of from 80° C. to 180° C.

51. The film of claim 50, wherein the film is a monolayer film.

52. The film of claim 50, wherein the film is a multilayer film.

53. A garment structure comprising the film of claim 51.

54. The garment structure of claim 53, wherein the garment structure is a diaper or an incontinence garment.

* * * * *